United States Patent
von Holzhausen et al.

(10) Patent No.: US 12,305,327 B2
(45) Date of Patent: May 20, 2025

(54) PLANT-BASED BIODEGRADABLE SYNTHETIC LEATHER

(71) Applicant: VON HOLZHAUSEN, Malibu, CA (US)

(72) Inventors: Vicki von Holzhausen, Malibu, CA (US); Sara Elizabeth Pink, Los Angeles, CA (US)

(73) Assignee: VON HOLZHAUSEN, Malibu, CA (US)

( * ) Notice: Subject to any disclaimer, the term of this patent is extended or adjusted under 35 U.S.C. 154(b) by 0 days.

(21) Appl. No.: 17/711,036

(22) Filed: Apr. 1, 2022

(65) Prior Publication Data

US 2022/0316133 A1    Oct. 6, 2022

Related U.S. Application Data

(60) Provisional application No. 63/169,782, filed on Apr. 1, 2021.

(51) Int. Cl.
*D06N 3/14*       (2006.01)
*B32B 5/02*       (2006.01)
(Continued)

(52) U.S. Cl.
CPC .............. *D06N 3/14* (2013.01); *B32B 5/022* (2013.01); *B32B 5/024* (2013.01); *B32B 5/026* (2013.01);
(Continued)

(58) Field of Classification Search
CPC ...... D06N 3/00; D06N 3/0056; D06N 3/0059; D06N 3/0065; D06N 3/0006;
(Continued)

(56) References Cited

U.S. PATENT DOCUMENTS 5,413,846 A  *  5/1995  Besana ................... D06N 3/14
                                                                 428/479.3
2003/0190438 A1 * 10/2003  Suzuki ................... B32B 27/12
                                                                 428/15
(Continued)

FOREIGN PATENT DOCUMENTS

CN       102182074 A  *   9/2011
KR       101619636 B1 *   5/2016

*Primary Examiner* — Larissa Rowe Emrich
(74) *Attorney, Agent, or Firm* — Fenwick & West LLP (57) ABSTRACT

A biodegradable synthetic leather is a layered material that includes a layer of a biodegradable polyurethane, a backing layer, and an adhesive layer. The layered material is formed by bonding a first surface of the biodegradable polyurethane layer to a first surface of the layer of the bamboo fiber through the adhesive layer. In some embodiments, the biodegradable polyurethane layer is made from a mixture of polyurethane, a biodegradable additive, and in some cases, a colorant. The biodegradable additive in the mixture enhances biodegradability of polyurethane. In some embodiments, there is 1 to 2 wt % of the biodegradable additive in the biodegradable synthetic leather. A biodegradable coating may be formed on a second surface of the layer of the bamboo fiber to further enhance biodegradability of the layered material. In some embodiments, the biodegradable synthetic leather is formed solely from ingredients of plants.

21 Claims, 5 Drawing Sheets

(51) Int. Cl.
*B32B 7/12* (2006.01)
*B32B 27/12* (2006.01)
*B32B 27/20* (2006.01)
*B32B 27/30* (2006.01)
*B32B 27/40* (2006.01)
*B32B 37/12* (2006.01)
*D06N 3/00* (2006.01)
*D06N 3/06* (2006.01)

(52) U.S. Cl.
CPC .............. *B32B 7/12* (2013.01); *B32B 27/12* (2013.01); *B32B 27/20* (2013.01); *B32B 27/304* (2013.01); *B32B 27/40* (2013.01); *B32B 37/12* (2013.01); *D06N 3/0006* (2013.01); *D06N 3/0009* (2013.01); *D06N 3/0011* (2013.01); *D06N 3/0015* (2013.01); *D06N 3/06* (2013.01); *B32B 2255/02* (2013.01); *B32B 2262/065* (2013.01); *B32B 2307/7163* (2013.01)

(58) Field of Classification Search
CPC ...... D06N 3/0009; D06N 3/0015; D06N 3/06; D06N 2211/28; D06N 2209/1607; D06N 2209/1614; D06N 3/14–148; D06N 2201/045; D06N 3/0086; D06N 3/009–0093; D06N 3/02–148; B32B 7/12; B32B 27/40; B32B 2307/7163
See application file for complete search history.

(56) References Cited

U.S. PATENT DOCUMENTS

| | | | | |
|---|---|---|---|---|
| 2018/0334773 | A1* | 11/2018 | Kang | B32B 27/12 |
| 2021/0310185 | A1* | 10/2021 | Von Holzhausen | D06N 3/183 |
| 2021/0332537 | A1* | 10/2021 | Polom | E01D 19/048 |
| 2022/0298377 | A1* | 9/2022 | Benaddi | C09D 175/04 |

* cited by examiner

Form a biodegradable layer from a mixture of a plastic and a biodegradable additive, the biodegradable polyurethane layer has a first surface
510

Form a backing layer from a plant fiber, the backing layer having a first surface and configured to mechanical support to the plant based synthetic leather
520

Bond the first surface of the biodegradable polyurethane layer with the first surface of the backing layer using an adhesive agent
530

FIG. 5

PLANT-BASED BIODEGRADABLE SYNTHETIC LEATHER

CROSS REFERENCE TO RELATED APPLICATION

This application claims priority to U.S. Provisional Application No. 63/169,782, filed on Apr. 1, 2021, which is incorporated by reference hereto for all purposes.

FIELD OF THE DISCLOSURE

The present disclosure generally relates to a synthesized material, and specifically to a synthesized material (e.g., leather) that includes a biodegradable layer (e.g., polyurethane) and a plant fiber layer.

BACKGROUND

Leather is used in various industries, such as fashion, furniture, and automotive industries. However, producing leather has an enormous environmental footprint spanning the greenhouses gases emitted in cattle farming to the water and chemicals used in the tanning process. Livestock production is a main contributor to greenhouse gas emissions. Also, the leather tanning industry is one of the largest polluting industries in the world.

Synthetic leather materials have been developed and widely used as an alternative to animal leather due to the lower cost of these synthetic materials. However, currently available synthetic leathers are mostly made from unsustainable plastic (such as petrochemically derived plastic) that is not biodegradable, which also places a burden on the environment. Also, those synthetic leathers fail to provide the qualities of animal leather that consumers desire, so many consumers tend to still prefer animal leather, especially for premium consumer products. Thus, improved technology for producing synthetic leather is needed to achieve higher sustainability and better performance while maintaining a premium leather look and feel.

SUMMARY

Embodiments relate to a synthetic material (e.g., synthetic leather), the composition of which is engineered to make it environmentally friendly and biodegradable, and to also achieve a premium look and feel that mimics a non-synthetic version of the material (e.g., animal leather). Leather is provided as an example throughout, though the synthetic material is not limited to leather, but can include other synthetic materials designed to mimic a non-synthetic material.

The synthetic leather includes a biodegradable layer (e.g., polyurethane, polyvinyl chloride or other polymer or biodegradable plastic layer), a backing layer, and an adhesive layer. Polyurethane is provided as an example throughout, though other types of polymer layers or biodegradable plastics can be used as the biodegradable layer. The biodegradable polyurethane layer provides the look and feel that mimics animal leather. For instance, the biodegradable polyurethane layer has a color, pattern, flexibility, and/or other characteristics of animal leather. The biodegradable polyurethane layer comprises a mixture of polyurethane and a biodegradable additive. The biodegradable additive enhances the biodegradability of polyurethane so that the synthesized leather can be naturally degraded. In some embodiments, there is 1-3 wt % of the biodegradable additive in the synthesized leather. The biodegradable polyurethane layer may further include a colorant that defines the color of the synthetic leather and a grain pattern and texture that mimics the grain pattern of animal leather.

The backing layer provides mechanical support to the synthetic leather. The backing layer is plant-based and comprises a fiber extracted from a plant, e.g., bamboo. The plant fiber can be woven, knitted, or assembled in a nonwoven manner to form the backing layer. The adhesive layer bonds the backing layer to the biodegradable polyurethane layer. In some embodiments, the adhesive layer is formed by applying an adhesive agent onto a first surface of the backing layer and a first surface of the biodegradable polyurethane layer, respectively, and applying pressure on one of the backing layer and the biodegradable polyurethane layer to press the backing layer and the biodegradable polyurethane layer against each other, e.g., under heat.

In some embodiments, the synthesized leather includes one or more biodegradable coatings to further enhance its biodegradability. For instance, the biodegradable coating can be a coating of a biodegradable powder sprayed onto a second surface of the backing layer, which opposes the first surface of the backing layer (e.g., is on an opposite side of the backing layer relative to the first surface). As another example, the biodegradable coating can be a coating formed by spraying a mixture of a biodegradable powder and a solvent onto a second surface of the biodegradable polyurethane layer, which opposes the first surface of the biodegradable polyurethane layer (e.g., is on an opposite side of the polyurethane layer relative to the first surface).

In one embodiment, the synthesized leather is completely plant-based or is composed entirely of components from plants. For instance, in addition to the backing layer, the polyurethane and biodegradable additive in the biodegradable polyurethane layer are made from chemicals derived from plants. The biodegradable powder used for forming the biodegradable coating can also be made from chemicals derived from plants.

BRIEF DESCRIPTION OF THE DRAWINGS

The teachings of the embodiments can be readily understood by considering the following detailed description in conjunction with the accompanying drawings.

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments relate to a plant-based synthetic leather and a method of forming the plant-based synthetic leather.

Biodegradable Layers

Figure 1:
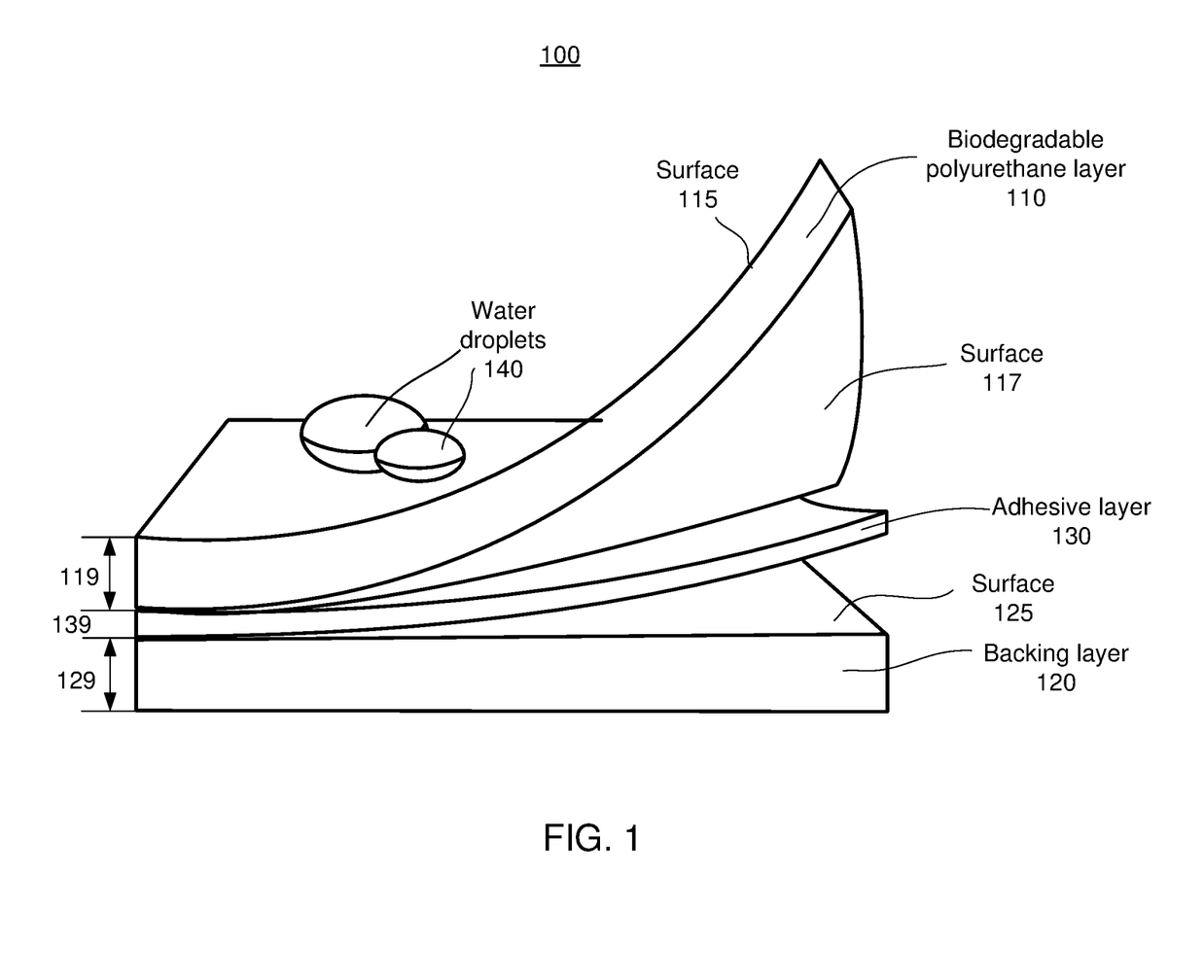
FIG. 1 is a conceptual diagram of a plant-based synthetic leather, in accordance with an embodiment.

FIG. 1 is a conceptual diagram of a plant-based synthetic material, in this particular example, it is a synthetic leather 100, in accordance with an embodiment. The synthetic leather 100 may be referred to as a plant-based synthetic leather. The synthetic leather 100 can be used as an alternative to animal leather. The synthetic leather 100 can be partially or completely plant based. For example, some or all of the ingredients in the synthetic leather 100 are made from plants. Compared with animal leather, the production of the synthetic leather 100 causes less pollution to the environment, such as less greenhouse gas emission and less toxic chemical releases. Also, the synthetic leather 100 is biodegradable, e.g., in a landfill, and can be broken down by microbes, which makes it more environmentally friendly. As shown in FIG. 1, the synthetic leather 100 includes a biodegradable polyurethane layer 110, a substrate such as a backing layer 120, and an adhesive layer 130. The synthetic leather 100 has a thickness between 0.5 mm to 1 mm (e.g., 0.55 mm, 0.65 mm, 0.75 mm, 0.85 mm, 0.9 mm or other thickness or sub-ranges within this range, evenly or unevenly). In one embodiment, the thickness of the synthetic leather 100 is 0.55 mm to 0.65 mm. In some other embodiments, the synthetic leather 100 may include different components. For instance, the synthetic leather 100 may include a biodegradable polyurethane layer 110. In some embodiments, the biodegradable layer may include a different plastic or polymer material, e.g., polyvinyl chloride. The synthetic leather 100 may have different thicknesses outside of this range or 0.5 mm to 0.8 mm (e.g., 0.4 mm, or 0.9 mm, 1.0 mm, 1.1 mm, 1.2 mm, etc.).

The biodegradable polyurethane layer 110 provides a look and feel that mimics animal leather. The biodegradable polyurethane layer 110 comprises a mixture of polyurethane and a biodegradable additive. Polyurethane has physical properties and characteristics that make it an attractive candidate to produce synthesized leather. For instance, polyurethane layers (e.g., coatings, sheets, etc.) are flexible like animal leather and are easy to be colored and patterned to make it look like animal leather. In some embodiment, there is 30-50 wt % of polyurethane in the synthetic leather 100.

The biodegradable additive enhances the biodegradability of polyurethane. For instance, the biodegradable additive attracts microorganisms to the synthetic leather 100 when released into the ecosystem (e.g., a landfill condition or a marine condition) so that the synthesized leather can be naturally degraded. The biodegradable additive itself is biodegradable and may be plant-based. The amount of the biodegradable additive is carefully controlled to enable fast and thorough natural biodegradation of the synthetic leather 100, but without interfering with or compromising the physical properties or characteristics of the polyurethane. In some embodiments, there is 1-2 wt % of the biodegradable additive in the synthetic leather 100. The biodegradable additive may include starch, bioaugmentation compounds, pro-oxidant compounds, or other types of compounds that can enhance the biodegradability of plastics. Examples of biodegradable additives include, e.g., ECO-ONE® plastic additive, BIOSPHERE® plastic additive, ECOPURE® plastic additive, and so on. In some embodiments, the biodegradable additive is integrally mixed with the polymer in the biodegradable layer 110.

In some embodiments, the biodegradable polyurethane layer 110 is plant-based to avoid the usage of toxic chemicals in the production of the biodegradable polyurethane layer 110 and to reduce the emission of greenhouses gases. The polyurethane and the biodegradable additive in the mixture can be synthesized by using chemicals derived from plants. For instance, the source of multifunctional monomers and oligomers for synthesizing polyurethane is plant oil.

The biodegradable polyurethane layer 110 may further include a colorant that defines the color of the synthetic leather 100. There can be 1-1.5 wt % (e.g., 1.1 wt %, 1.2 wt %, 1.3 wt %, 1.4 wt %, etc., or other values or sub-ranges within this range) of the colorant in the synthetic leather 100. In one embodiment, the mixture is generated by adding the colorant (e.g., liquid colorant) into polyurethane (e.g., liquid polyurethane) and then adding the biodegradable additive. The biodegradable additive may be in the form of a powder. The mixture is heated at a temperature in the range of 170° C. to 190° C. (e.g., 175° C., 180° C., 185° C., etc., or other values or sub-ranges within this range). After the heating, the mixture is cooled down, e.g., to room temperature by using a cooling roller at a cooling rate of 5° C. in 3-5 seconds, to form the biodegradable polyurethane layer 110. In some embodiments, the thickness 119 of the biodegradable polyurethane layer 110 is from 0.08 mm to 0.17 mm (e.g., 0.09 mm, 0.1 mm, 0.12 mm, 0.13 mm, 0.15 mm, 0.16 mm, 0.17 mm, etc., and other values or sub-ranges within this range). In one embodiment, the thickness 119 is approximately 0.1 mm. The surface 115 is designed to be water-resistant and therefore outperforms animal leather that typically is not water resistant. As shown in FIG. 1, the water droplets 140 on the surface 115 stay on the surface 115 and are not absorbed by the synthetic leather 100.

The biodegradable polyurethane layer 110 is flexible and has a smooth surface 115 that has a look and feel similar to animal leather. In some embodiments, the surface 115 has a grain pattern and texture that mimics the grain pattern and texture of animal leather. The grain pattern and texture can be created by using a template that has a pattern. For example, a mirror image of the grain pattern and texture may be formed on the surface 115 using the template. An example of the template is a release paper. The template is attached onto the surface 115 of the biodegradable polyurethane layer 110 during the process of producing the biodegradable polyurethane layer 110 and/or the process of bonding the biodegradable polyurethane layer 110 to the backing layer 120 to imprint the pattern of the template onto the surface 115 to generate the grain pattern and texture. The template can be removed after the biodegradable polyurethane layer 110 is bonded to the backing layer 120.

In some embodiments, the biodegradable polyurethane layer 110 is configured to be a protective layer and to act as a barrier between the other layers of the synthetic leather 100 and the environment. For instance, the biodegradable polyurethane layer 110 provides the durability of the synthetic leather 100 and can withstand scratches.

In some embodiments, the backing layer 120 provides a mechanical support to the synthetic leather 100 and serves as the substrate of the biodegradable layer 110. The backing layer 120 is plant based and comprises a fiber extracted from a plant, e.g., bamboo. In some embodiments, bamboo is harvested and broken into chips. The bamboo chips are chemically softened, e.g., by using an enzyme wash, to produce bamboo pulp. Fibers are extracted from the bamboo pulp. The fibers can be spun into intended fiber sizes. In some embodiments, the fiber is a staple fiber that can be twisted to form yarn. The plant fiber can be woven, knitted, or assembled in a non-woven form to form the backing layer 120. In some embodiments, the backing layer 120 is produced from the fiber in a knit construction. The backing layer 120 has a thickness 129 from 0.42 mm to 0.83 mm (e.g., 0.5 mm, 0.55 mm, 0.6 mm, etc., or values or subranges within the range). In one embodiment, the thickness is approximately 0.5 mm.

The adhesive layer 130 bonds the backing layer 120 to the biodegradable polyurethane layer 110. In some embodiments, the adhesive layer 130 is formed by applying an adhesive agent on a surface 125 of the backing layer 120. The adhesive agent, in one example, is a polyurethane-based synthetic adhesive, natural latex, or a bio-based glue. After the adhesive agent is applied, the biodegradable polyurethane layer 110 and the backing layer 120 are pressed together (e.g., pressure is applied on either side of the layers forcing them inward against the adhesive agent to bond the layers together. The resulting adhesive layer 130 is therefore between the surface 125 of the backing layer 120 and a surface 117 of the biodegradable polyurethane layer 110, which opposes (e.g., is on the opposite side of) the surface 115 of the biodegradable polyurethane layer 110 (surfaces 115 and 117 face outward in opposite directions relative to each other). The adhesive layer 130 has a thickness 139 from 0.001 mm to 0.01 mm (e.g., 0.002 mm, 0.005 mm, 0.008 mm, etc. or any value or sub-range within this range). In some embodiments, there is 2-4 wt % of the adhesive agent in the synthetic leather 100.

Figure 2:
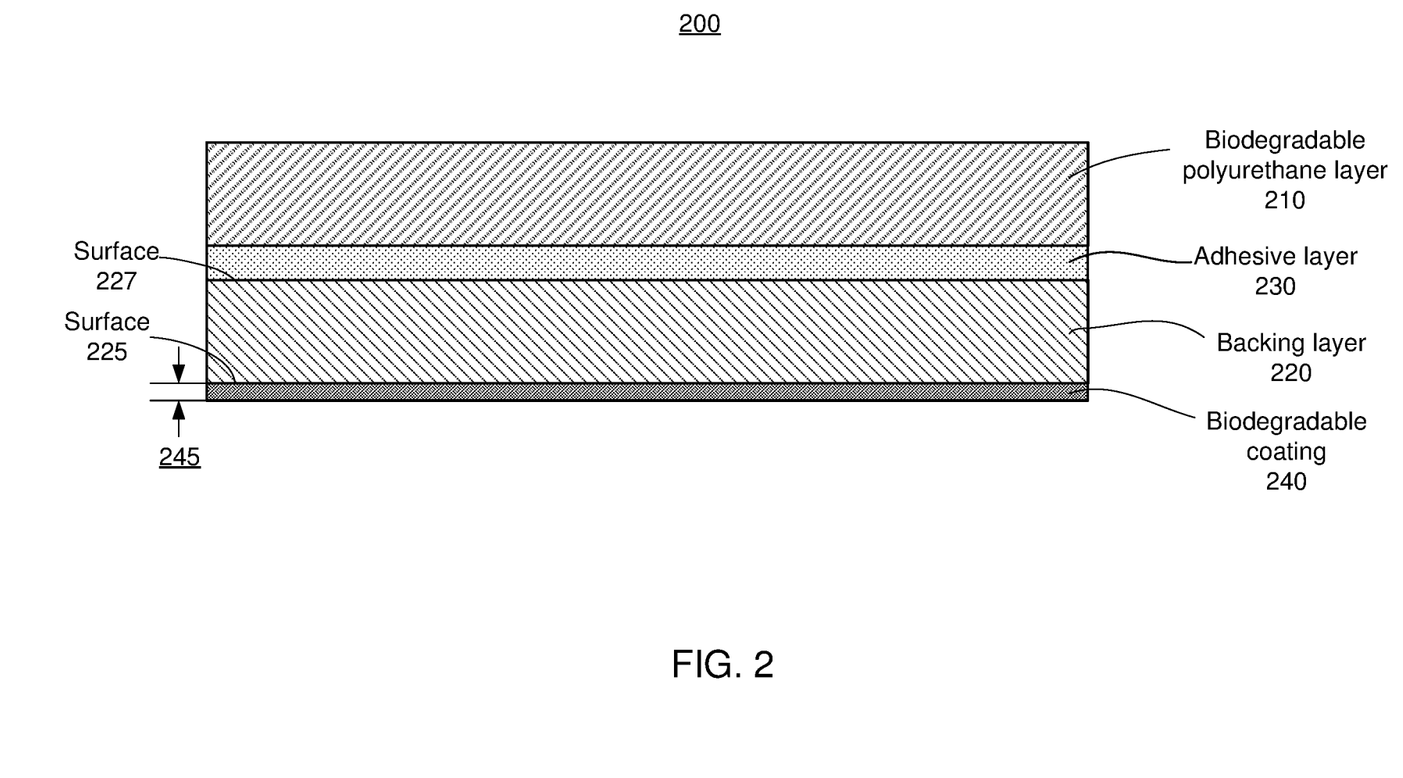
FIG. 2 is a cross-sectional view of another plant-based synthetic leather, in accordance with an embodiment.

FIG. 2 is a cross-sectional view of an example plant-based biodegradable synthetic leather 200, in accordance with an embodiment. The plant-based biodegradable synthetic leather 200 includes a biodegradable polyurethane layer 210, a backing layer 220, and an adhesive layer 230, which are similar to the corresponding components of the synthetic leather 100 as described above in conjunction with FIG. 1. Additionally, the plant-based synthetic leather 200 includes a biodegradable coating 240.

The biodegradable coating 240 enhances biodegradability of the plant-based synthetic leather 200. The biodegradable coating 240 is a coating of, for example, a biodegradable additive. The coating can be formed by generating a mixture from the biodegradable additive and spraying the mixture onto (or applied in some other manner) a surface 225 of the backing layer 220, which opposes the surface 227 (e.g., is on the opposite side of the backing layer 220 relative to the surface 227) that is in contact with the adhesive layer 230. Surfaces 225 and 227 of the backing layer face outward relative to each other. The mixture, which may be a liquid, is generated by mixing the biodegradable additive with a solvent. In one example, the ratio of the biodegradable additive to the solvent in the mixture is 1:99. The biodegradable additive may dissolve in the solvent. The solvent may be an organic solvent, e.g., ethylene-vinyl acetate (EVA), or dichloromethane. In one embodiment, the biodegradable additive in the biodegradable coating 240 is the same as the biodegradable additive in the biodegradable polyurethane layer 210. In some embodiments, the biodegradable coating 240 has a thickness 245 that is 0.5-1% of the total thickness of the plant-based synthetic leather 200. The thickness 245 may be in the range from 0.0008 to 0.0017 mm (e.g., 0.0009, 0.001, 0.0011, or other values in the range).

In some embodiments, the biodegradable additive is applied to both the polyurethane layer 210 and the backing layer 220 but is applied differently in these two layers. With respect to the polyurethane layer 210, 1% (or another suitable concentration) biodegradable additive may be mixed with liquid polyurethane and colorant so that the biodegradable additive is integrally mixed with polyurethane in the polyurethane layer 210. The integral mixture may enhance the biodegradability of polyurethane, which by itself may not be biodegradable. With respect to the backing layer 220, the backing layer 220 may be plant based and comprises a fiber extracted from a plant, e.g., bamboo. The backing layer 220 may be naturally biodegradable in the presence of microbes. In some embodiments, instead of mixing the plant fiber with the biodegradable additive, the biodegradable additive is sprayed on the backing layer 220 to form a biodegradable coating 240. The coating may provide protection and sealing to the backing layer 220. In some embodiments, as illustrated in FIG. 3, an additional coating of biodegradable additive may further be sprayed onto the polyurethane layer 210 that has biodegradable additive integrally mixed with polyurethane.

Figure 3:
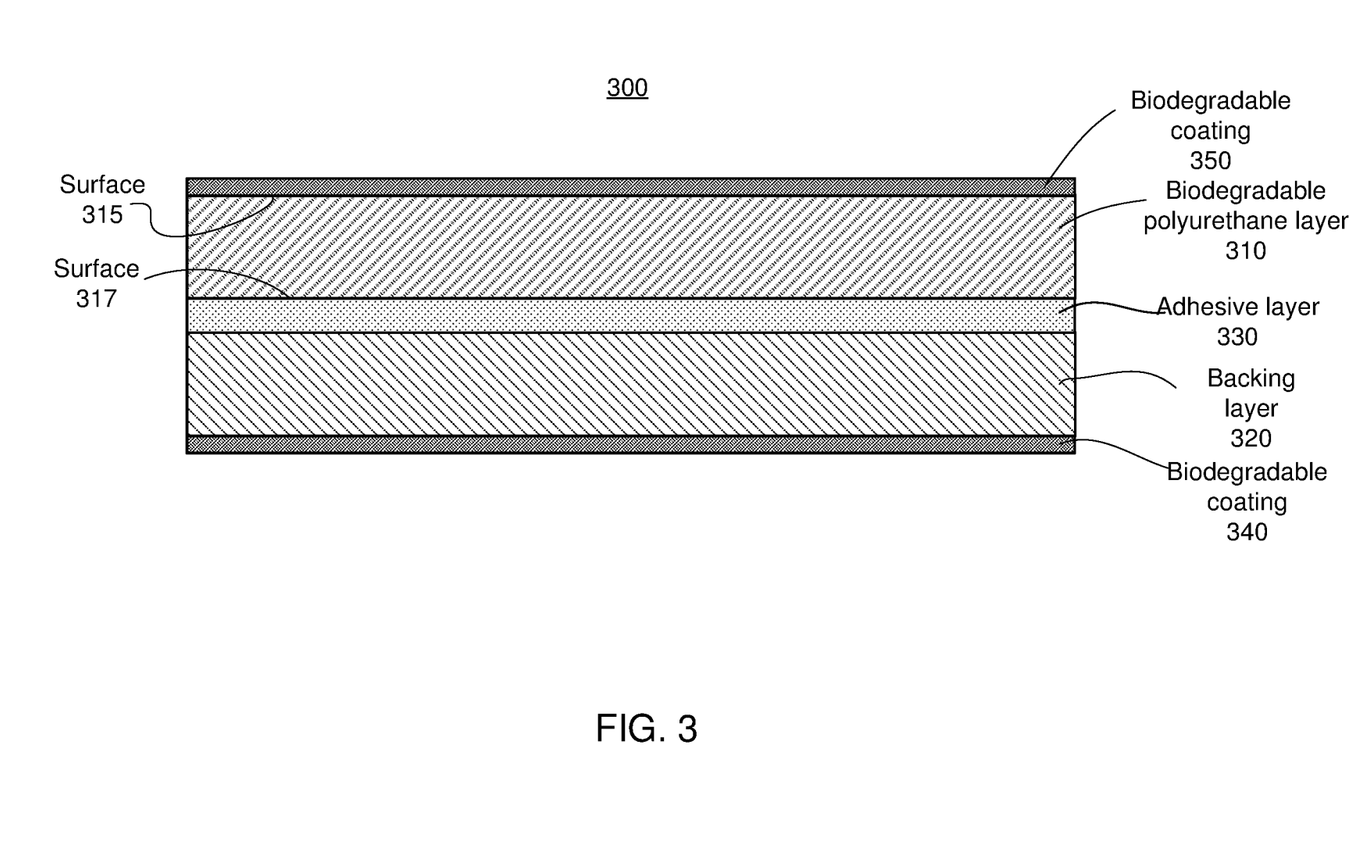
FIG. 3 is a cross-sectional view of yet another plant-based synthetic leather, in accordance with an embodiment.

FIG. 3 is a cross-sectional view of an example plant-based biodegradable synthetic leather 300, in accordance with an embodiment. The plant-based biodegradable synthetic leather 300 includes a biodegradable polyurethane layer 310, a backing layer 320, an adhesive layer 330, and a biodegradable coating 340, which components are similar to the corresponding components of the plant-based synthetic leather 200 as described above in conjunction with FIG. 2. Additionally, the plant-based synthetic leather 300 includes another biodegradable coating 350.

The biodegradable coating 350 further enhances biodegradability of the plant-based synthetic leather 300. Similar to the biodegradable coating 340, the biodegradable coating 350 is a coating of a biodegradable powder, for example. The coating can be sprayed (or otherwise applied) onto a surface 315 of the biodegradable polyurethane layer 310, which opposes the surface 317 of the biodegradable polyurethane layer 310 that is in contact with the adhesive layer 330 (surface 315 sits on the side of the biodegradable polyurethane layer 310 opposite of surface 317). In one embodiment, the biodegradable power is a powder form of the same biodegradable additive in the biodegradable polyurethane layer 310. In some embodiments, the biodegradable coating 350 has a thickness that is 0.5-1% of the total thickness of the plant-based synthetic leather 300. The thickness may be in the range from 0.0008 to 0.0017 mm (e.g., 0.0009, 0.001, 0.0011, or other values in the range).

Natural Degradation Process

Figure 4:
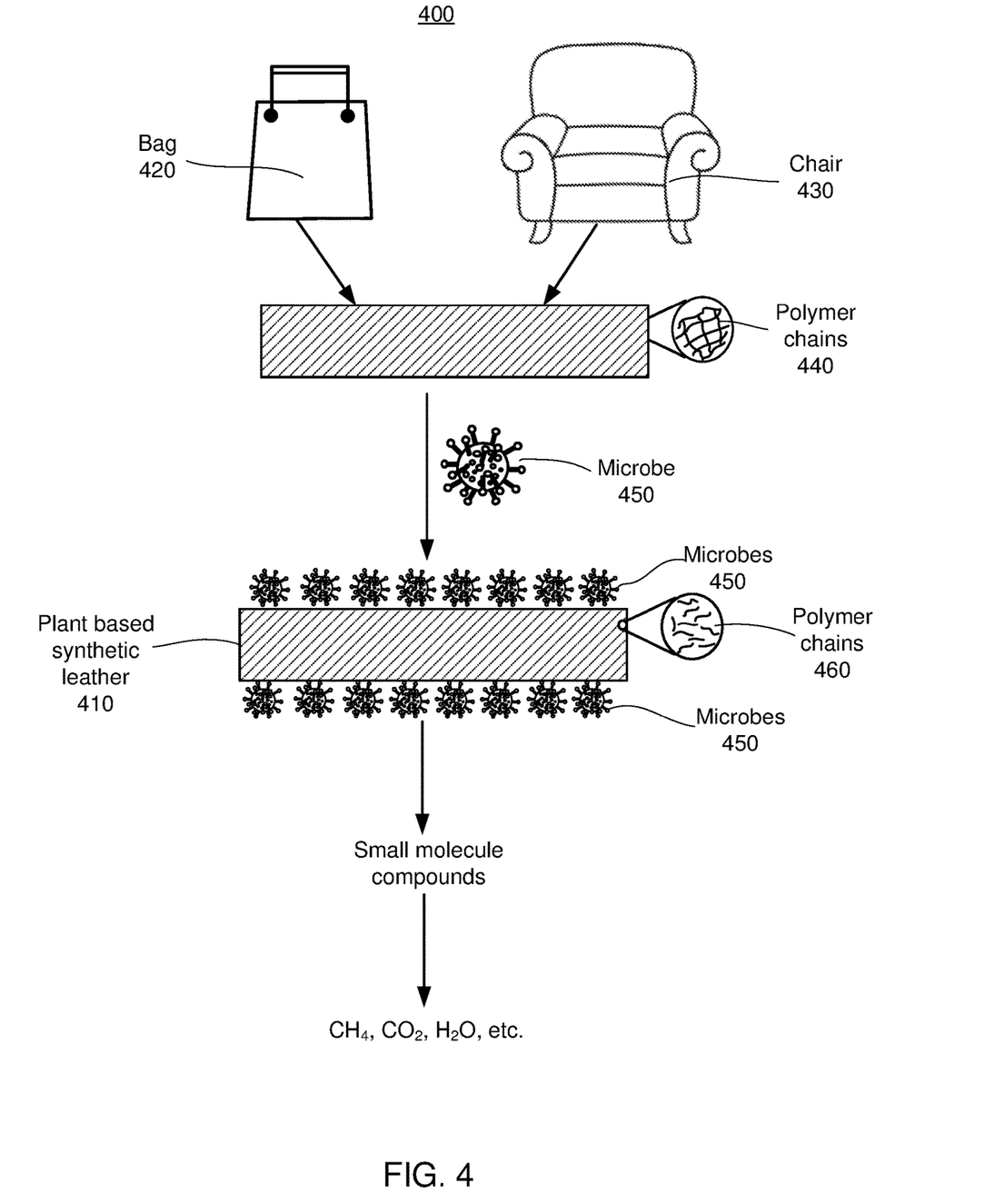
FIG. 4 illustrates a process of natural degradation of a plant-based synthetic leather, in accordance with an embodiment.

FIG. 4 illustrates a process 400 of natural degradation of a plant-based synthetic leather 410, in accordance with an embodiment. The plant-based synthetic leather 410 is used to make products, such as the bag 420 and chair 430 in FIG. 4, as an alternative to animal leather. An embodiment of the plant-based synthetic leather 410 is the synthetic leather 100, 200, or 300 described above.

The plant-based synthetic leather 410 includes a biodegradable polyurethane layer and a backing layer. The backing layer is made from a plant fiber and therefore, is naturally degradable. The biodegradable polyurethane layer includes polyurethane mixed with a biodegradable additive. The polyurethane includes polymer chains 440 that are connected or cross-linked. When the bag 420 or the chair 430 are released to an ecosystem that includes microbes 450 (individually referred to as microbe 450, and collectively referred to as microbes 450), such as a landfill or natural marine environment, the biodegradable additive attracts the microbes 450 so that the microbes 450 accumulate on surfaces of the plant-based synthetic leather 410. The biodegradable additive increases the surface of the polymer chains 440 for the microbes 450 to attack and may further assist in enzymatic reactions that enable the microbes to digest and convert polyurethane into elements that can re-enter the ecosystem.

The accumulated microbes 450 break down the polymer chains 440 of the polyurethane in the plant-based synthetic leather 410, e.g., through hydrolysis and/or oxidization. The breaking down of the polymer chains 440 can be a result of an interaction of polyurethane with enzymes produced by the microbes 450. As shown in FIG. 4, the polymer chains 440 are disconnected and broken down into shorter polymer chains 460. The interaction of polyurethane with the enzymes can result in small molecule compounds. These small molecule compounds can further be degraded into inorganic molecules, such as methane ($CH_4$), carbon dioxide ($CO_2$), water ($H_2O$), etc. In some embodiments, the degraded plant based synthetic leather is in a form that is similar to food waste.

That is, during the process 400, the biodegradation of the plant-based synthetic leather 410 is caused by organismic activities that cause disintegration and conversion of polyurethane into elements that can re-enter the ecological cycle with minimum burden to the environment. The process 400 in FIG. 4 is one example of the degradation process of the plant-based synthetic leather 410. However, in other embodiments, the plant-based synthetic leather 410 can be naturally degraded through a different process.

Method of Production

Figure 5:
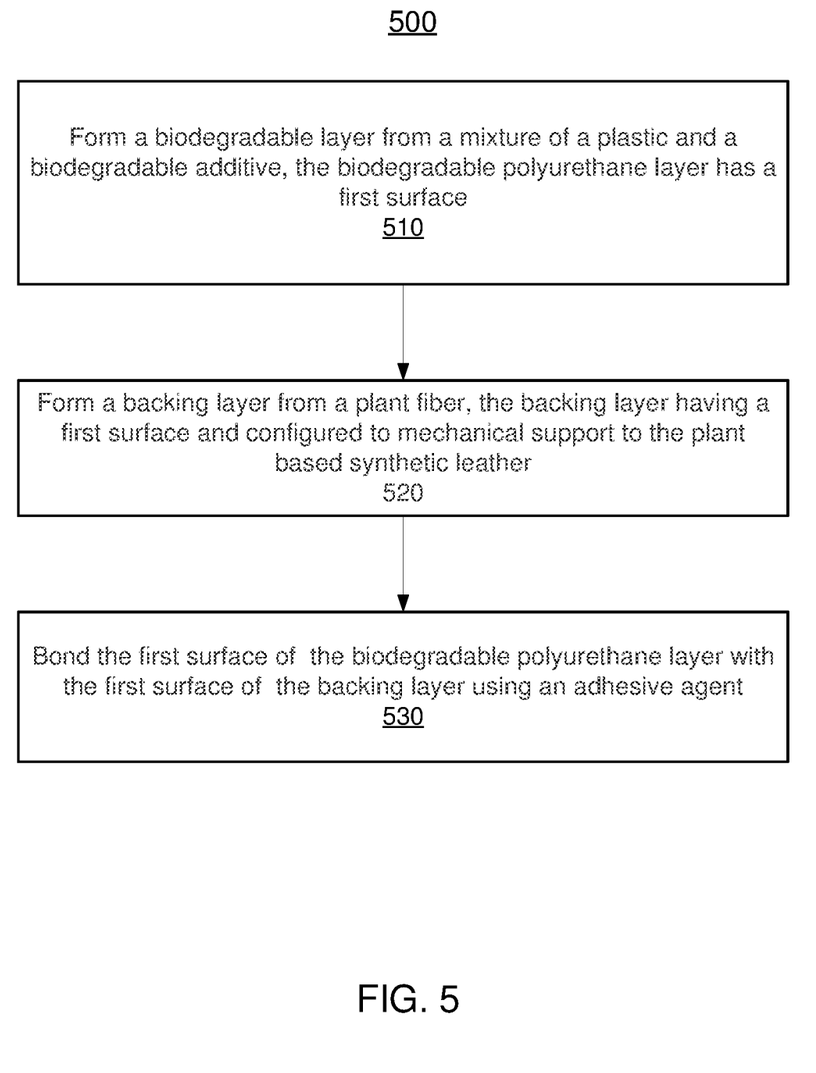
FIG. 5 is a flow chart illustrating a method for producing a plant-based synthetic leather, in accordance with an embodiment.

FIG. 5 is a flow chart illustrating a method 500 for manufacturing or producing a plant-based synthetic leather, in accordance with an embodiment. The plant-based synthetic leather is an embodiment of the synthetic leather 100 described above in conjunction with FIG. 1. The method may include different or additional steps than those described in conjunction with FIG. 5 in some embodiments or perform steps in different orders than the order described in conjunction with FIG. 5.

The method 500 includes forming 510 a biodegradable layer from a mixture of a plastic and a biodegradable additive. The biodegradable layer has a first surface. The biodegradable layer is configured to be biodegradable and to provide a feel and look mimicking animal leather. In some embodiments, the biodegradable layer is formed by mixing the plastic (e.g., polyurethane, polyvinyl chloride, other types of plastic, or some combination thereof) in a liquid state with the biodegradable additive in a powder state to form the mixture and heating the mixture at a temperature in a range from 170° C. to 190° C. The mixture is then cooled down, e.g., at a cooling rate of 5° C. in 3-5 seconds. The thickness of the formed biodegradable layer may be 0.08 mm to 0.17 mm. In some embodiments, the biodegradable layer is formed solely from ingredients of one or more plants.

In some embodiments, the biodegradable layer includes a colorant that defines the color of the biodegradable layer. The mixture of the plastic and colorant that results in the colored biodegradable layer is created by mixing the plastic in a liquid state with a colorant in a liquid state. This results in the formation of a preliminary mixture. Then the biodegradable additive in a powder state is mixed into the preliminary mixture to form the colored biodegradable layer.

In some embodiments, the biodegradable layer is formed with a pattern that mimics a pattern of animal leather. The pattern can be formed on the biodegradable layer by attaching a template for the pattern on the surface of the biodegradable layer. In one embodiment, the template is a release paper. The template remains on the biodegradable layer during the forming and the biodegradable layer. The template may remain on the biodegradable layer until the biodegradable layer is bonded to a backing layer. The template may be removed after the bonding.

The method 500 also includes forming 520 a backing layer from a plant fiber. The backing layer has a first surface and is configured to provide mechanical support to the plant-based synthetic leather. In some embodiments, the plant fiber is bamboo fiber. The backing layer is formed by knitting or weaving bamboo fibers. Or bamboo fibers can be bonded together in a non-woven construction, e.g., through a chemical, mechanical, or thermal treatment. An example of the chemical treatment includes using a bonding agent (e.g., an adhesive resin) to bind the bamboo fibers together. An example of the mechanical treatment includes applying physical force to the bamboo fibers (e.g., by punching needles through a web of the bamboo fibers) to bond the bamboo fibers together. An example of thermal treatment includes heating up the bamboo fibers to make them sufficiently hot to adhere to each other.

The bamboo fiber can be extracted from bamboo through a pulping process. A thickness of the backing layer may be 0.42 mm to 0.83 mm (e.g., 0.5 mm, 0.6 mm, etc. and values or sub-ranges within the range).

The method 500 further includes bonding 530 the first surface of the biodegradable layer with the first surface of the backing layer using an adhesive agent. An example of the adhesive agent is a polyurethane-based synthetic adhesive, a bio-based glue, or natural latex. In some embodiments, the biodegradable layer is bonded to the backing layer by applying the adhesive agent on the first surface of the backing layer and applying pressure on the side of the biodegradable layer or by pressing the biodegradable layer and the backing layer against each other with the first surface of the biodegradable layer facing the first surface of the backing layer.

The biodegradable layer has a second surface that opposes its first surface (e.g., the first and second surfaces are on either side of the biodegradable layer and face outward). The second surface forms the exterior surface of the plant-based synthetic leather and provides the look and feel mimicking animal leather. The second surface of the biodegradable layer may have a color and/or pattern, as discussed above. In some embodiments, the method 500 may also include spraying a biodegradable additive onto the second surface of the biodegradable layer to form a biodegradable coating on the second surface of the biodegradable layer.

The backing layer also has a second surface that opposes its first surface (the surfaces are on opposite sides of the layer facing outward relative to each other). The second surface is the interior surface of the plant-based synthetic leather. In some other embodiments, the method 500 may also include spraying a biodegradable powder onto the second surface of the backing layer to form a biodegradable coating on the second surface of the backing layer. The biodegradable powder can be the powder form of the biodegradable additive used to provide the biodegradable layer. The biodegradable coating on the second surface of the biodegradable layer or the backing layer can further enhance biodegradability of the plant-based synthetic leather so that the plant-based synthetic leather can be naturally degraded when it is released into the ecosystem, e.g., a landfill or marine environment. In some embodiments, the biodegradable coating has a thickness that is 0.5% to 1% of a thickness of the plant-based synthetic leather.

Biodegradability Testing

Plant-based biodegradable synthetic leather samples may be submitted for testing of biodegradability under various standardized tests, such as ASTM D5511, in accordance with some embodiments. A biodegradability test may determine the degree and rate of anaerobic biodegradation of synthetic leathers in high-solid anaerobic conditions. The test materials may be exposed to a methanogenic inoculum derived from anaerobic digesters operating on pretreated household waste. The anaerobic decomposition may take place under high-solids (more than 30% total solids) and static non-mixed conditions. The test may yield a percentage of conversion of carbon in the sample to carbon in the gaseous form under conditions found in high-solids anaerobic digesters, treating municipal solid waste.

In some embodiments, anaerobically digested sewage sludge may be mixed with household waste. To make the sludge adapted and stabilized during a short post-fermentation at 53° C., the sludge may be pre-incubated (e.g., for one week) at 53° C. A sample of the anaerobic digested sewage sludge may be analyzed for pH, percent dry solids, and volatile solids, as well as, the amount of $CO_2$ and $CH_4$ evolution during the testing. Table 1 lists the results of an initial testing.

TABLE 1

| Parameters | Test Requirement Range | Actual results |
|---|---|---|
| pH | 7.5 to 8.5 | 7.82 |
| Kjeldahl nitrogen | 0.5 to 2 g/kg wet weight | 1.24 |
| Dry Solids at 105° C. | >20% | 46.00 |
| Volatile Solids at 550° C. | Below 1 g/kg wet weight | 0.75 |

In some embodiments, an ASTM D5511 standard test for determining anaerobic biodegradation under high-solids anaerobic-digestion conditions may be conducted. Sufficient inoculum (approximately 15 kg) may be removed from a post-fermentation vessel and be mixed consistently to obtain a homogeneous medium. Testing may be repeated for a blank sample (inoculum only), for a positive control sample with a reference material (e.g., a thin-layer chromatography cellulose), and for the test synthetic leather sample being evaluated. Multiple positive control samples may be used as replicates. 1000 g wet weight (at least 20% dry solids) of inoculum in a small container may be manually mixed for a period of 2 to 3 min with 15 to 100 g of volatile solids of the test sample or a control. For the blank sample containing inoculum only, 1000 g of ame inoculum may be mixed in a small container for a period of 2 to 3 min with the same intensity. The weight of the inoculum and test substance added to each individual flask may be determined accurately. The mixtures may be added to a 2-L wide-mouth Erlenmeyer flask and gently spread to compact the material evenly in the flask to a uniform density. After placing the Erlenmeyer flask in incubator, the flask is connected with a gas collection device. The Erlenmeyer flasks may be incubated in the dark or in diffused light at 52° C. (or 62° C.) for thermophilic conditions. The incubation time may be run until no net gas production is noted for at least five days from both the positive control and test sample reactors. The pH of the water used to measure biogas production may be controlled to less than 2 by adding HCl.

In an actual test, the biochemical characteristics of the inoculum such as pH, Volatile Fatty Acids, $NH_4^+$—N— and dry solids were studied.

The biogas volume in the gas sampling bag was measured (Table-2). Presence of gas in the gas collector of the positive control indicated that the inoculum was viable and gas displacement was observed both in positive control and test sample. In one example requirement, the positive control should achieve 70% of degradation within 30 days with deviation less than 20% of the mean between the replicates. In an example actual testing, the positive control showed 71.70% of degradation on 27th day with less than 20% of the mean difference between the replicates. The gas displacement observed after 180 days is as shown in the table 2 below.

TABLE 2

| Biodegradation Test | Total Volume 180 days (mL) |
|---|---|
| Inoculum | 4060 |
| Positive control (Cellulose) | 11610 |
| Synthetic Leather Sample | 9730 |

In an actual test, the percentages of biodegradation of positive control and test synthetic leather sample were calculated by the measured cumulative carbon dioxide and methane production from each flask after subtracting carbon dioxide evolution and methane evolution from the blank samples at the end of 180 days of testing. Calculations were based on Total Organic Carbon obtained of both positive control and test synthetic leather sample. The percentage biodegradability of test synthetic leather sample and different metrics with respect to the positive control and the inoculum control are shown in Table 3 below.

TABLE 3

| Group | Inoculum control | Positive control (Cellulose) | Synthetic Leather Sample |
|---|---|---|---|
| Weight | 1000 ml | 10.1254 | 10.1412 g |
| Total volume (ml) | 4060.00 | 11610.00 | 9730.00 |
| % $CH_4$ | 14.90 | 47.90 | 45.30 |
| Volume of $CH_4$ (ml) | 604.94 | 5561.19 | 4407.69 |
| weight of $CH_4$ (g) | 0.3968 | 3.6481 | 2.8914 |
| % $CO_2$ | 16.50 | 47.700 | 52.10 |
| Volume of $CO_2$ (ml) | 669.90 | 5537.97 | 5069.33 |
| Weight of $CO_2$ (g) | 1.3264 | 10.9652 | 10.0373 |
| Total weight of carbon in grams | 0.6558 | 5.6967 | 4.8786 |
| Theoretical weight of carbon in grams (Ci) | — | 4.2598 | 4.4743 |
| Biodegradation | — | 1.1834 | 0.9438 |
| % Biodegradation | — | 100.00 | 94.38 |

In some embodiments, a synthetic leather sample in accordance with an embodiment achieves a biodegradation rate of 80% of a positive control such as cellulose. In some embodiments, a synthetic leather sample achieves a biodegradation rate of 85% of a positive control. In some embodiments, a synthetic leather sample achieves a biodegradation rate of 90% of a positive control. In some embodiments, a synthetic leather sample achieves a biodegradation rate of 91% of a positive control. In some embodiments, a synthetic leather sample achieves a biodegradation rate of 85% of a positive control. In some embodiments, a synthetic leather sample achieves a biodegradation rate of 90% of a positive control. In some embodiments, a synthetic leather sample achieves a biodegradation rate of 91% of a positive control. In some embodiments, a synthetic leather sample achieves a biodegradation rate of 92% of a positive control. In some embodiments, a synthetic leather sample achieves a biodegradation rate of 93% of a positive control. In some embodiments, a synthetic leather sample achieves a biodegradation rate of 94% of a positive control. For example, in an actual test, a synthetic leather sample achieves a biodegradation rate of 94.38% of a positive control. In some embodiments, a synthetic leather sample achieves a biodegradation rate of 95% of a positive control. In some embodiments, biodegradation rate may be measured by the total weight of carbon (carbon dioxide and methane) produced in a degradation process. In some embodiments, the biodegradation rate may be measured by the total weight of carbon produced minus the weight of carbon produced in a inoculum control compared to the theoretical weight of carbon based on the materials used.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A biodegradable synthetic leather, comprising:
   a biodegradable layer comprising a mixture of a plastic and a biodegradable additive, the biodegradable layer having a first surface;
   a backing layer comprising bamboo fibers, the backing layer having a first surface and being configured to provide mechanical support to the biodegradable layer;
   an adhesive layer between the first surface of the biodegradable layer and the first surface of the backing layer for bonding the biodegradable layer to the backing layer; and
   a biodegradable coating comprising another biodegradable additive directly on a second surface of the backing layer, the second surface of the backing layer on an opposite side of the backing layer relative to the first surface of the backing layer,
   wherein the biodegradable coating is formed by:
     dissolving a powder of the another biodegradable additive in a solvent to form a second mixture,
     applying the second mixture onto the second surface of the backing layer, and
     wherein the biodegradable additive of the biodegradable layer and the another biodegradable additive of the biodegradable coating are the same biodegradable additive.

2. The biodegradable synthetic leather of claim 1, wherein the mixture is formed by mixing the plastic in a liquid state with the biodegradable additive in a liquid state, the plastic comprising a polyurethane or polyvinyl chloride.

3. The biodegradable synthetic leather of claim 1, wherein the plastic comprises polyurethane.

4. The biodegradable synthetic leather of claim 3, wherein a weight percentage of polyurethane in the biodegradable synthetic leather is in a range from 30 to 50.

5. The biodegradable synthetic leather of claim 3, wherein a weight percentage of the biodegradable additive in the biodegradable synthetic leather is in a range from 1 to 2.

6. The biodegradable synthetic leather of claim 1, wherein the mixture further comprises a colorant.

7. The biodegradable synthetic leather of claim 6, wherein a weight percentage of the colorant in the biodegradable synthetic leather is in a range from 1 to 1.5.

8. The biodegradable synthetic leather of claim 1, wherein the biodegradable layer is produced from plants.

9. The biodegradable synthetic leather of claim 1, wherein a thickness of the biodegradable layer is in a range from 0.35 mm to 0.55 mm.

10. The biodegradable synthetic leather of claim 1, wherein the plant fiber including the bamboo fiber is produced through a pulping process.

11. The biodegradable synthetic leather of claim 1, wherein the backing layer is formed by knitting or weaving the bamboo fiber.

12. The biodegradable synthetic leather of claim 1, wherein a thickness of the backing layer is in a range from 0.4 mm to 0.65 mm.

13. The biodegradable synthetic leather of claim 1, wherein a weight percentage of the adhesive layer in the biodegradable synthetic leather is in a range from 2 to 4.

14. The biodegradable synthetic leather of claim 1, wherein the biodegradable coating is formed by spraying the second mixture onto the second surface of the backing layer.

15. The biodegradable synthetic leather of claim 1, wherein a thickness of the biodegradable coating is 0.5% to 1% of a thickness of the biodegradable synthetic leather.

16. The biodegradable synthetic leather of claim 1, wherein a second biodegradable coating is formed by spraying the mixture onto a second surface of the biodegradable layer.

17. The biodegradable synthetic leather of claim 1, wherein the biodegradable synthetic leather has a biodegradation rate of at least 85% of that of cellulose.

18. A biodegradable synthetic leather formed by a method, comprising:
   forming a biodegradable layer from a mixture of a plastic and a biodegradable additive, the biodegradable layer having a first surface;
   forming a backing layer from a bamboo fiber, the backing layer having a first surface and being configured to provide mechanical support to the biodegradable synthetic leather;
   bonding the first surface of the biodegradable layer with the first surface of the backing layer using an adhesive agent; and
   forming a biodegradable coating comprising another biodegradable additive directly on a second surface of the backing layer, the second surface of the backing layer on an opposite side of the backing layer relative to the first surface of the backing layer, further comprising:
     dissolving a powder of the another biodegradable additive in a solvent to form a second mixture, and
     applying the second mixture onto the second surface of the backing layer, and
     wherein the biodegradable additive of the biodegradable layer and the another biodegradable additive of the biodegradable coating are the same biodegradable additive.

19. The method of claim 18, wherein the plastic is polyurethane.

20. The biodegradable synthetic leather of claim 1, wherein a thickness of the biodegradable layer is 0.35 mm to 0.55 mm, wherein a thickness of the backing layer is 0.4 mm to 0.65 mm, and wherein a thickness of the biodegradable coating is 0.0008 mm to 0.0017 mm.

21. The biodegradable synthetic leather of claim 1, wherein each of the biodegradable additive and the other biodegradable additive comprises at least one or a combination of starch, a bioaugmentation compound, a pro-oxidant compound, and a biodegradable plastic additive.

* * * * *